United States Patent [19]

Büssing et al.

[11] Patent Number: 4,518,732

[45] Date of Patent: May 21, 1985

[54] SOLID STABILIZER COMPOSITION

[75] Inventors: Jürgen Büssing, Bensheim; Hubert Müller, Dieburg, both of Fed. Rep. of Germany

[73] Assignee: Ciba Geigy Corporation, Ardsley, N.Y.

[21] Appl. No.: 611,914

[22] Filed: May 18, 1984

Related U.S. Application Data

[63] Continuation of Ser. No. 544,920, Oct. 24, 1983, abandoned, which is a continuation of Ser. No. 389,642, Jun. 18, 1982, abandoned, which is a continuation of Ser. No. 304,522, Sep. 21, 1981, abandoned, which is a continuation of Ser. No. 182,549, Aug. 29, 1980, abandoned, which is a continuation of Ser. No. 37,593, May 9, 1979, abandoned.

[30] Foreign Application Priority Data

May 19, 1978 [CH] Switzerland ............... 5463/78

[51] Int. Cl.$^3$ .................. C08K 5/00; C08L 91/06
[52] U.S. Cl. ............................. 524/178; 106/271; 524/180; 524/181
[58] Field of Search ............ 106/271; 524/178–182, 524/277

[56] References Cited

U.S. PATENT DOCUMENTS

| 2,358,963 | 9/1944 | Davis | 106/198 |
|---|---|---|---|
| 2,600,321 | 6/1952 | Pyle . | |
| 3,382,199 | 5/1968 | Scullin | 524/153 |
| 3,461,081 | 8/1969 | Sugahara | 252/400 |
| 3,666,700 | 3/1972 | King et al. . | |
| 3,755,200 | 8/1973 | Rhodes et al. . | |
| 3,883,362 | 5/1975 | Yates et al. | 106/268 |
| 3,898,189 | 8/1975 | Bonnaud et al. | 524/501 |
| 3,986,995 | 10/1976 | Yates et al. | 106/268 |
| 4,040,996 | 8/1977 | Van Vonno | 524/178 |
| 4,040,997 | 8/1977 | Van Vonno | 524/178 |

FOREIGN PATENT DOCUMENTS

| 290137 | 9/1970 | Austria . |
| 1026 | 3/1979 | European Pat. Off. . |
| 1692522 | 8/1971 | Fed. Rep. of Germany . |
| 2238148 | 3/1973 | Fed. Rep. of Germany . |
| 2546900 | 5/1976 | Fed. Rep. of Germany . |
| 50-109943 | 8/1975 | Japan . |
| 373183 | 12/1963 | Switzerland . |
| 404191 | 8/1966 | Switzerland . |
| 514636 | 12/1971 | Switzerland . |
| 43-77 | of 1977 | Trinidad and Tobago . |
| 1205729 | 9/1970 | United Kingdom . |

OTHER PUBLICATIONS

Technical Bulletin, "Advastab LS-201", Aug. 1977.
Technical Bulletin, "Advastab LS-202", Aug. 1977.
Rompps, Wachs (Waxes), 3857, (1977).
Safety Bulletin for "Advastab LS-202", Dec. 1977.
A. W. Purzer, Eidestattliche Erklärung Technical Bulletin, "Advastab LS-101", Aug. 1977.
Telex, A. W. Purzer, dated Aug. 2, 1983.
Technical Bulletin, "Advastab TM-692".
Documents on "Baropan TK 80B and TK 82B".
Kirk-Othmer, Encyclopedia of Chemical Technology, vol. 15, 1968, p. 749.
L. I. Naturman, SPE Journal, Jun. 1964, 507.

*Primary Examiner*—Theodore Morris
*Attorney, Agent, or Firm*—Luther A. R. Hall

[57] ABSTRACT

A solid composition, suitable for stabilizing a halogen-containing polymer, consisting essentially of (a) 16.7 to 50% by weight of a liquid sulfur-containing organotin stabilizer, in intimate admixture with (b) 83.3 to 50% by weight of a solid lubricant, having a melting point of 50° to 120° C., selected from the group consisting of paraffin wax, montan wax, oxidized paraffin wax, oxidized polyethylene wax, oxidized and partially saponified polyethylene wax and mixtures thereof.

4 Claims, No Drawings

SOLID STABILIZER COMPOSITION

This is a continuation of application Ser. No. 544,920, filed Oct. 24, 1983, now abandoned, which in turn is a continuation of application Ser. No. 389,642, filed June 18, 1982, now abandoned, which in turn is a continuation-in-part of application Ser. No. 304,552, filed Sept. 21, 1981, now abandoned, which in turn is a continuation of application Ser. No. 182,549, filed Aug. 29, 1980, now abandoned, which in turn is a continuation of application Ser. No. 37,593, filed May 9, 1979, now abandoned.

BACKGROUND OF THE INVENTION

Plastics frequently require the addition of additives. Such additives can be for example solid or liquid stabilisers, which in practice are used often not on their own, but together with further auxiliaries, such as lubricants. It is in this respect desirable to summarise relevant liquid and solid products.

Thus, from the German Auslegeschrift No. 1,544,697 is known the method of converting solid, particularly pulverulent, stabilisers, by fusing them together with lubricants, into suitable dust-free mixtures. The German Auslegeschrift No. 1,569,190 discloses a mixture, likewise formed in the melt, of a lubricant with solid stabilizers (component b). A similar mixture of solid, high-melting stabilizers with lubricants is described in the German Auslegeschrift No. 1,542,058.

Whereas therefore practicable suggestions have been made for combinations of solid stabilisers with lubricants, the combination of liquid stabilisers with solid lubricants has not hitherto been satisfactorily achieved. Liquid additives have thus so far been converted by absorption onto carrier substances, such as porous fillers or resins, into the solid form. This method has however the disadvantage that further additives find their way into the plastics material, a factor which is not always desirable, which frequently constitutes unnecessary filler material, and which can render necessary, for example, a renewed application for obtaining approval from the health authorities.

Various procedures for introducing requisite additives, including stabilizers, lubricants, pigments and fillers, into halogenated polymers such as poly(vinyl chloride), PVC, are described in U.S. Pat. Nos. 4,040,996 and 4,040,997. Among these is the concept of premixing a melted wax lubricant and stabilizer to form a homogeneous melt followed by cooling said melt. Unfortunately the resulting mixture is found to be an unsatisfactory semi-solid paste, difficult to handle in any practical way. Additionally the liquid stabilizer tends to migrate to the surface and to separate from the wax after only a few days storage. These patents point out that it has not been found possible to make a sufficiently complete and uniform mixture of additives and wax lubricants which can be handled in existing equipment and facilities to assure that each portion of the mixture chosen for mixing with a batch of PVC will have the same proportions of the different additives. This is a critical problem since some additives are used in the stabilized PVC in very low concentrations, such as 0.1 parts per hundred parts of resin.

Recognizing these inherent problems, U.S. Pat. No. 4,040,996 and 4,040,997 teach the use of aqueous emulsions of processing lubricants and stabilizers to coat the surface of selected pigments, fillers and mixtures thereof followed by evaporation of the water of the emulsion as a route to overcome the aforementioned difficulties with semi-solid paste mixtures of wax lubricants and PVC stabilizers.

OBJECT OF THE INVENTION

It was the object of the invention to provide a practicable method of combining liquid additives in general with solid lubricants, the novel method having none of the disadvantages experienced hitherto. To accomplish this task, it is suggested according to the invention that a solid combination of a liquid additive with a solid lubricant in intimate admixture with each other be obtained. The intimate admixture is achieved in particular by bringing together additive and lubricant with heating, especially at a temperature above the melting point of the lubricant, for example by heating the lubricant to a temperature above its melting point, and then stirring in the liquid additive. The maximum absorption capacity can be readily ascertained by preliminary tests. The homogeneous mixture is subsequently cooled, with various procedures being possible, for example: allowing the mass to solidify en bloc, pouring onto a cooling conveyer, spraying, pouring onto the external zone of a rotating disk, or pouring into water or into another cooling medium. The solidified material is optionally further treated by, for example, being pulverised, ground or reduced to flakes.

DETAILED DESCRIPTION OF THE INVENTION

More particularly, the invention provides a solid composition, suitable for stabilizing a halogen-containing polymer, consisting essentially of (a) 16.7 to 50% by weight of the total composition of a liquid sulfur-containing organotin stabilizer or mixtures thereof, in intimate admixture with (b) 83.3 to 50% by weight of the total composition of a solid lubricant having a melting point of 50°–120° C. selected from the group consisting of paraffin wax, montan wax, oxidized paraffin wax, oxidized polyethylene wax, oxidized and partially saponified polyethylene wax and mixtures thereof.

The lubricants used are solid and have a melting point of 30°–250° C., preferably 50°–120° C. Suitable lubricants are polar or non-polar, are also designated as so-called internal and external lubricants, and are for example paraffins, such as hard paraffin, polyethylene waxes, also oxidised and partially saponified, montan waxes, wax esters, fatty alcohols, mono- and polybasic fatty acids, salts and esters thereof, esters of polyhydric alcohols and fatty acid amides. To be emphasized are paraffins, but also mixtures of two, three or more lubricants.

The instant composition is prepared by heating the solid lubricant to a temperature above its melting point, adding thereto the liquid stabilizer with agitation to achieve an intimate admixture thereof, then cooling the molten admixture to solidify the solid stabilizer composition.

The employed liquid additives are plastics stabilisers in the widest sense, such as thermostabilisers and light stabilisers, plasticisers, antioxidants, co-stabilisers, antistatic agents, flameproofing agents, or alternatively again lubricants, and of these in particular barium-cadmium stabilisers, but above all organotin stabilisers and phosphites; and most especially organotin stabilisers containing sulfur.

The mixture ratio of liquid additive to solid lubricant is about 2:1 to 1:100, particularly 1:1 to 1:5.

The latter ratio is equivalent to a % by weight in the total composition of about 16.7 to about 50% for the liquid additive and about 83.3 to about 50% for the solid lubricant.

The combination according to the invention can optionally contain further additives, which can be added in the hot or cooled state. If the combination for example is somewhat tacky, processing aids may be added, which ensure in the melt an adequate flow effect, for example a copolymeric acrylate/methacrylate or polymethacrylate. Suitable further additives are for example modifiers which influence the impact strength for example in PVC, such as ABS, MBS, chlorinated polyethylene, or EVA. As a rule, even dry-pourable compositions are subsequently cold-mixed with a processing aid, such as calcium stearate, permitting the formulation of products tailored to the end-use requirements of the marketplace.

The combination according to the invention renders possible the use of solid, for example pulverulent, additives in any type of polymers in which liquid stabilisers are employed. There may for example be mentioned: polyolefins, such as polyethylene of high and low density, polypropylene, ethylene/propylene copolymers, styrene polymers, such as polystyrene, styrene/butadiene/acrylonitrile copolymers, mixtures of polyolefins or of styrene polymers; polyamides, polyurethanes, such as those based on polyethers or polyesters, and particularly halogen-containing polymers, such as vinyl chloride homopolymers and -copolymers, especially polyvinyl chloride. The incorporation of the solid combination according to the invention can be effected in the customary manner.

Considerable advantages are gained by the use of the combinations according to the invention. Thus, no filler substances which can lead to changes of the properties in the polymer, and which moreover are uneconomical, are necessary. The handling of liquid additives is greatly simplified; dosing presents no problems and there is moreover imparted to the additive used a water-repellent property. This is favourable with regard to application since no moisture is carried over into the processing stage, and moisture sensitive additives are better protected. Furthermore, the combinations according to the invention are storage-stable and are particularly easy to handle.

These advantages were not to be anticipated from the prior art. It was in particular not to be expected that polar and non-polar lubricants would have in any way an adequate absorbing capacity for liquid additives. This absorbing capacity has proved to be surprisingly large, so large that, in accordance with the invention, a technically practicable and moreover advantageous solution of the stated problem is provided.

The invention is illustrated in the following with the aid of preferred embodiments, without any limitation of the subject matter of the invention being imposed thereby. Ratio values relate to weight ratios, and the term "parts" denotes parts by weight.

TEST 1

Testing of the miscibility of lubricants with a liquid additive (di-n-octyltin-bis-isooctylthioglycolate).

| Lubricant | Softening point [°C.] |
| --- | --- |
| stearic acid | 60 |
| bis-stearoylethylenediamine | 144 |
| paraffin waxes | 54/72/99 |
| ox. paraffin wax | 103 |
| ox. and partially saponified polyethylene wax | 104 |
| stearyl alcohol | 52 |
| glycerol monostearate | 62 |
| stearyl stearate | 58 |

Mixtures of 1:0.5 to 1:1.5 of lubricant and additive were produced. The softening points decreased in the case of the mixtures containing most additive up to around 10° (C.) from the initial value. The state of the cooled and ground or pulverised mixtures was wax-like to dry-pourable up to a mixture ratio of 1:1. Beyond this, the majority of products, with exception of the paraffin waxes, exhibited a slight to a more pronounced tackiness of the surface.

TEST 2

Results form mixing tests on solid lubricants with various additives ("parts" relate to parts by weight) are summarised in the Table which follows.

| Ex. No. | Lubricant | | Liquid additive | Mixture ratio | Remarks |
| --- | --- | --- | --- | --- | --- |
| 1 | stearic acid | | barium-nonylphenolate | 15 parts 1:0.5 | wax-like |
| | | | cadmium-2-ethylhexoate | 20 parts 1:0.5 | |
| | | | zinc-2-ethylhexoate | 2 parts 1:0.5 | |
| | | | triphenyl phosphite | 38 parts 1:0.5 | |
| | | | aliphatic hydrocarbon | 25 parts 1:0.5 | |
| 2 | as Example 1 | | as Example 1 | 1:1 | tacky |
| 3 | as Example 1 | | as Example 1 | 1:1.5 | greasy |
| 4 | as Example 1 | | didecylphenylphosphite | 1:0.5 | wax-like |
| 5 | as Example 1 | | as Example 4 | 1:1 | tacky |
| 6 | as Example 1 | | epox. soya bean oil | 1:0.5 | wax-like |
| 7 | as Example 1 | | as Example 6 | 1:1 | tacky |
| 8 | 12-hydroxystearic acid | | as Example 4 | 1:0.5 | slightly tacky |
| 9 | as Example 8 | | as Example 4 | 1:1 | tacky |
| 10 | paraffin wax | | dibutyltinmaleic acid ester | 1:0.5 | dry, crumbly |
| 11 | as Example 10 | | as Example 10 | 1:1 | slightly tacky |
| 12 | 12-hydroxystearic acid | 0.4 part | as Example 4 | 1:0.5 | wax-like |
| | stearylstearate | 0.5 part | | 1:1 | wax-like |
| 13 | paraffin wax | 0.8 parts | dimethyltin-bis-thioglycolic | 1:0.2 | pourable |
| | Ca-stearate | 0.8 parts | acid isooctyl ester | | |
| | | | monomethyltin-tris-thioglycolic | | |
| | | | acid isooctyl ester | | |
| 14 | as Example 13 | 1.4 parts | di-n-octyltin-bis-thioglycolic | 1:0.2 | pourable |
| | as Example 13 | 0.6 parts | acid isooctyl ester | | |
| 15 | ox. polyethylene wax | 0.8 parts | dibutyltin-bis-maleic | 1:1.6 | (with the addition |

| Ex. No. | Lubricant | | Liquid additive | | Mixture ratio | Remarks |
|---|---|---|---|---|---|---|
| | paraffin wax | 0.8 parts | acid monobutyl ester | | | of processing aids) polyacrylic/ methacrylic acid butyl ester pourable |
| 16 | as Example 12 as Example 12 | 0.5 parts 0.5 parts | as Example 4 epoxy plasticiser | 0.6 parts 1.5 parts | 1:2.1 | (with addition of pulv. BaCd stabiliser) barium laurate 30 cadmium laurate 60 pentaerythritol 5 bisphenol-A 5 wax-like |
| 17 | stearyl alcohol stearyl stearate polyethylene wax | 0.5 parts 0.7 parts 0.2 parts | as Example 14 | | 1:0.7 | wax-like (with addition of processing aids) polyacrylic/ methacrylic acid butyl ester pourable |
| 18 | paraffin wax ox. paraffin wax polyethylene wax | 0.6 parts 0.6 parts 0.2 parts | dibutyltin-bis-thiopropionic acid isooctyl ester epoxy plasticiser | 1.5 parts 1.5 parts | 1:2.2 | (with addition of modifier) methacrylic acid ester/butadiene/ styrene terpolymer pourable |

When the composition of solid lubricant and liquid additive contains more than 50% by weight of liquid additive, greasy compositions ensue with all the concomitant difficulties associated with such a product. This is demonstrated by Example 3.

While it is possible to overcome this problem by the addition of quantities of solid processing aids such as calcium stearate, polyacrylic/methacrylic acid butyl ester or methacrylic acid ester/butadiene/styrene terpolymer as is seen in Examples 15 and 18, the instant invention teaches the preparation of solid lubricant compositions which are dry-pourable or exhibit only minimum tackiness without resorting to such processing aids.

The most preferred embodiments of the instant invention are exemplified in Examples 19 and 20.

The most preferred solid lubricants are paraffin wax, montan wax, oxidized paraffin wax, oxidized polyethylene wax, oxidized and partially saponified polyethylene wax or mixtures thereof, present in the solid composition at about 83.3 to about 50% by weight of the total composition.

The most preferred liquid additives are the organotin stabilizers containing sulfur which are present in the solid composition at about 16.7 to about 50% by weight of the total composition.

EXAMPLE 19

Compositions of four different solid lubricants with liquid additive mixture of monooctyltin tris-thioglycolate 2-ethylhexyl ester/dioctyltin bis-thioglycolate 2-ethylhexyl ester (20/80) were prepared at three different concentrations to show the effect of the liquid additive content in the instant composition on the resulting composition properties.

| Lubricant 1.0 part | Liquid additive mixture parts (% by weight of composition) | | |
|---|---|---|---|
| | 2.0 (66.7%) | 1.0 (50%) | 0.5 (33.3%) |
| paraffin wax | a* | c | c |
| oxidized polyethylene wax | a | c | c |
| oxidized and partially saponified polyethylene wax | a | c | c |
| partially saponified montan wax | a | c | c |

*a = greasy composition
c = dry-pourable composition

When the concentration of the liquid additive exceeded 50% by weight of the total composition, with each lubricant, the final composition was greasy; however, at the 50% level or below, the final composition was in each case dry-pourable.

EXAMPLE 20

Compositions of various liquid organotin stabilizers containing sulfur in three different solid lubricants were prepared at three different concentrations to show the effect of liquid additive content in the composition on resulting composition properties and to illustrate the broad applicability of the instant invention to liquid organotin stabilizer compounds containing sulfur moieties.

The results given in the table below show that dry-pourable compositions or compositions with a minimum level of tackiness can be prepared using a variety of organotin stabilizers which are alkyl-mercaptides, aliphatic carboxyalkylmercaptides or esters of thioalkanoic acids.

| Organotin Stabilizers Containing Sulfur, 1 part | Solid Lubricants parts (% by weight of composition) | | |
|---|---|---|---|
| | 0.5(33.3) | 1.0(50) | 2.0(66.7) |
| | Paraffin Wax | | |
| 1. Monomethyl-tin tris-thioglycolate* (20) | a** | c | c |

-continued

| Organotin Stabilizers Containing Sulfur, 1 part | Solid Lubricants parts (% by weight of composition) | | |
|---|---|---|---|
| | 0.5(33.3) | 1.0(50) | 2.0(66.7) |
| 1. Dimethyl-tin bis-thioglycolate* (80) | | | |
| 2. Dibutyl-tin bis-thioglycolate* | a | c | c |
| 3. Monobutyl-tin tris-thioglycolate* (75) Dibutyl-tin bis-thioglycolate* (25) | a | b | c |
| 4. Diocotyl-tin bis-thioglycolate* | a | b | c |
| 5. Monooctyl-tin tris-thioglycolate* (20) Dioctyl-tin bis-thioglycolate* (80) | a | c | c |
| 6. Monocarbutoxyethyl-tin tris-thioglycolate*(8) Dicarbutoxyethyl-tin bis-thioglycolate* (92) | a | b | c |
| 7. Monomethyl-tin tris-mercaptoethyloleate | a | b | c |
| 8. Dibutyl-tin bis-laurylmercaptide | a | c | c |
| Oxidized Polyethylene Wax | | | |
| 3. Monobutyl-tin tris-thioglycolate* (75) Dibutyl-tin bis-thioglycolate* (25) | a | c | c |
| 5. Monooctyl-tin tris-thioglycolate* (20) Dioctyl-tin bis-thioglycolate* (80) | a | c | c |
| 7. Monomethyl-tin tris-mercaptoethyloleate | a | c | c |
| Oxidized & Saponified Polyethylene Wax | | | |
| 5. Monooctyl-tin tris-thioglycolate* (20) Dioctyl-tin bis-thioglycolate* (80) | a | c | c |

*each thioglycolate is a 2-ethylhexyl ester
**a = greasy composition
b = tacky composition
c = dry-pourable composition When the concentration of liquid organotin stabilizer exceeded 50% of the total concentration with each lubricant, the final composition was greasy; however, at the 50% level or below the final composition was dry-pourable or only exhibited minimum tackiness.

It is pointed out that such compositions exhibiting any tackiness are easily converted to free flowing powders by subsequent cold mixing with a small amount of solid processing aid, such as calcium stearate.

What is claimed is:

1. A dry pourable solid composition, suitable for stabilizing a halogen-containing polymer, consisting essentially of
   (a) about 16.7 to about 50% by weight of the total composition of a liquid sulfur-containing organotin stabilizer or mixtures thereof, in intimate admixture with
   (b) about 83.3 to about 50% by weight of the total composition of a solid lubricant, having a melting point of 50°-120° C., selected from the group consisting of paraffin wax, montan wax, oxidized paraffin wax, oxidized polyethylene wax, oxidized and partially saponified polyethylene wax and mixtures thereof.

2. A composition according to claim 1, wherein the liquid sulfur-containing organotin stabilizer is selected from the group consisting of monooctyltin tris-(thioglycolate 2-ethylhexyl ester), dioctyltin bis-(thioglycolate 2-ethyl hexyl ester), monomethyltin tris-(thioglycolate 2-ethylhexyl ester), dimethyltin bis-(thioglycolate 2-ethylhexyl ester), dibutyltin bis-(thioglycolate 2-ethylhexyl ester), monobutyltin tris-(thioglycolate 2-ethylhexyl ester), monocarbutoxyethyltin tris-(thioglycolate 2-ethylhexyl ester), dicarbutoxyethyltin bis-(thioglycolate 2-ethylhexyl ester), monomethyltin tris-(mercaptoethyl oleate), dibutyltin bis(laurylmercaptide), and mixtures thereof, and wherein the solid lubricant is selected from the group consisting of paraffin wax, montan wax, oxidized and partially saponified polyethylene wax, oxidized polyethylene wax, and mixtures thereof.

3. A process for stabilizing a halogen-containing polymer which consist of incorporating therein an effective amount of a composition according to claim 1.

4. A process according to claim 3, wherein the halogen-containing polymer is a vinyl chloride homopolymer or copolymer.

* * * * *